June 28, 1932.  C. C. BRUNNER  1,865,354
COOKING DEVICE
Filed Oct. 9, 1929   2 Sheets-Sheet 2
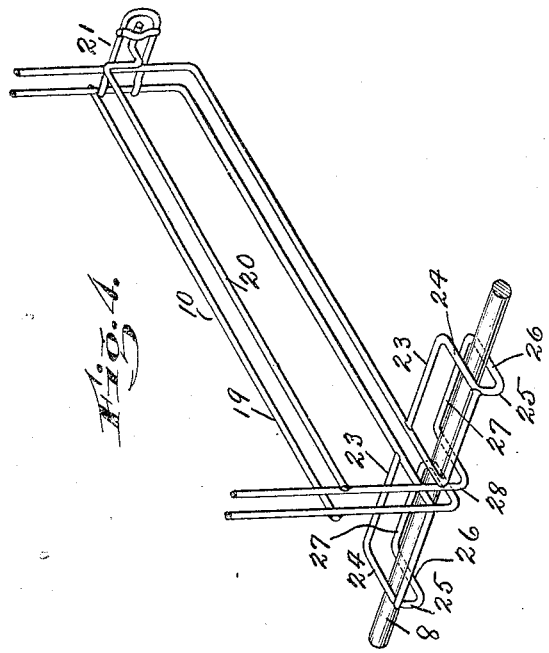
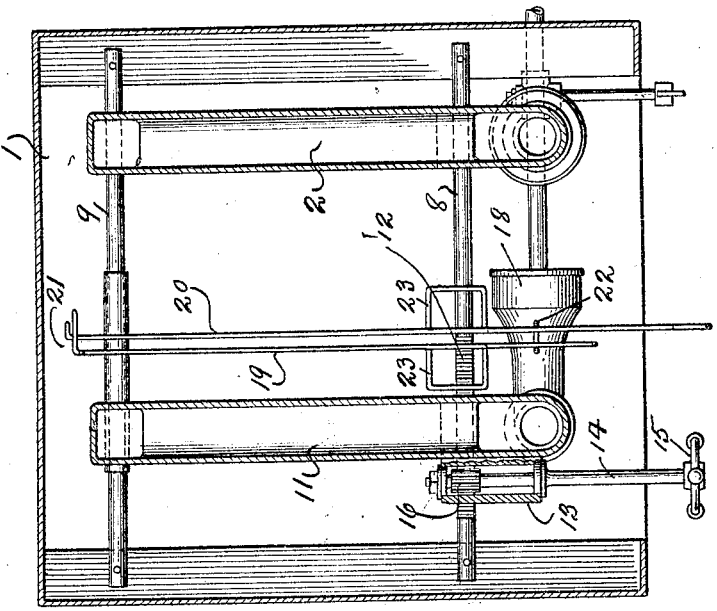
INVENTOR.
Charles C. Brunner.
BY
Riddle, Margeson and Hornidge
ATTORNEYS.

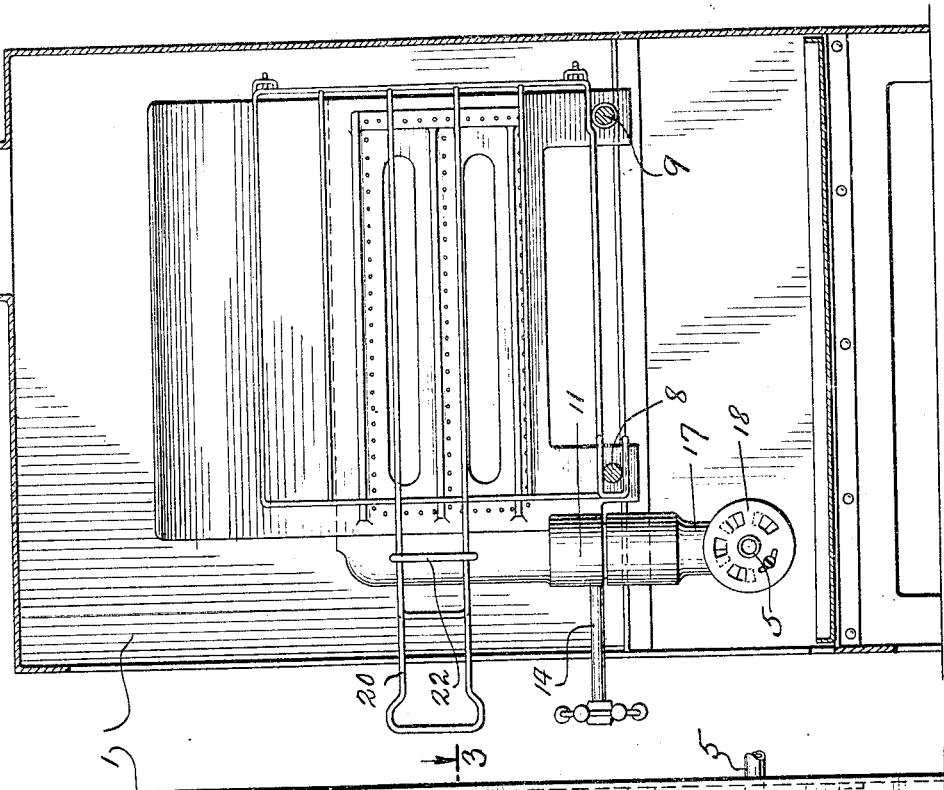
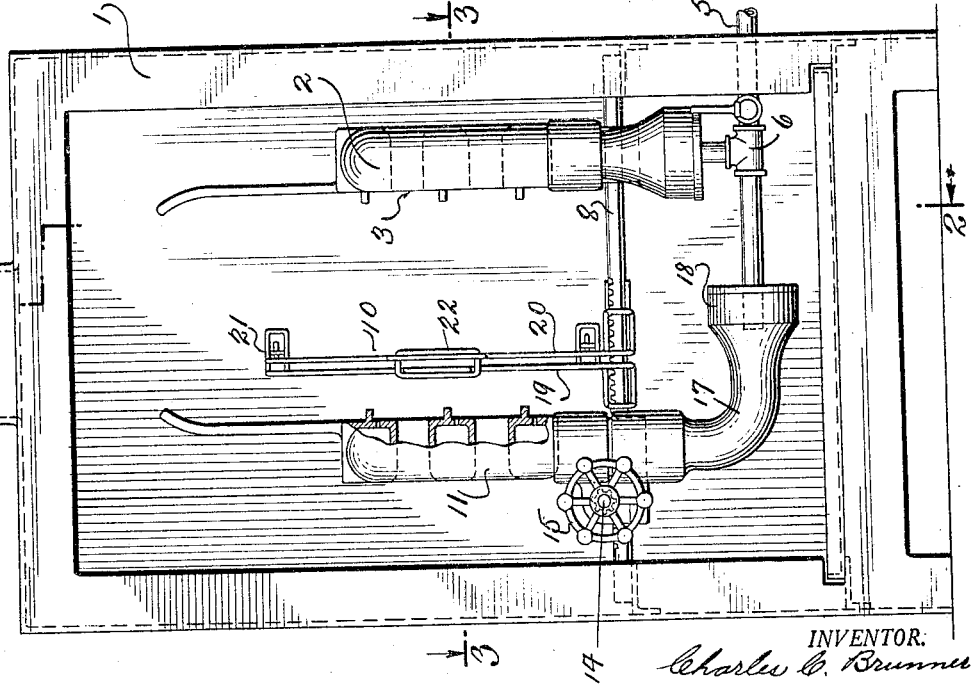

Patented June 28, 1932

1,865,354

UNITED STATES PATENT OFFICE

CHARLES C. BRUNNER, OF FOREST HILLS, NEW YORK, ASSIGNOR TO H. NORECK CO., INC., OF PORT CHESTER, NEW YORK, A CORPORATION OF NEW YORK

COOKING DEVICE

Application filed October 9, 1929. Serial No. 398,299.

This invention relates to an improvement in cooking devices such as broilers, and has for one of its objects the provision of a construction wherein the heat from the burners is applied to both sides of the food to be cooked at the same time.

A further object of my invention is the provision of a construction wherein the food rack, that is to say, the apparatus by which the food to be cooked is supported and one of the burners or cooking devices is made adjustable with respect to the other burner or heating device, thereby enabling the food and the burners or heating devices to be readily relatively adjusted to facilitate the cooking or broiling of the food.

A still further object of my invention is the provision of a cooking device or a broiler of the general type above described in which the apparatus for shifting the burner or heating device has been greatly simplified with respect to broilers as heretofore constructed and employing movable burners or heaters.

A still further object of my invention is the provision of a broiler or cooking device embodying certain constructional details adapting the same for use either with gas or electricity. In this connection it should be noted that the apparatus has been illustrated as equipped for the employing of gas as a fuel. It is to be understood, however, that slight changes in the same construction can be employed for the use of electricity instead of gas, in which event the means for shifting one of the burners or heaters would be employed as illustrated as well as the rack by which the food to be cooked or broiled is supported.

A still further object of my invention is the provision of a cooker or broiler embodying a movable burner in which when gas is employed as a fuel a single valve or cock can be employed for regulating the flame of both burners.

In the accompanying drawings:

Fig. 1 is a view in front elevation of a cooker or broiler embodying my invention;

Fig. 2 is a section on the line 2—2 of Fig. 1;

Fig. 3 is a section on the line 3—3 of Fig. 1; and

Fig. 4 is a view of the food rack.

Referring to the drawings in detail, it will be seen that my improved apparatus comprises a box or housing 1 and within this box or housing at one side thereof is rigidly mounted a fixed burner 2. This burner extends from front to rear of the box 1, as shown in Fig. 3, and as will be understood is provided in its face 3 with suitable outlets for the flame of the gas employed as a fuel. The lower end of the burner 2 is provided with a mixing chamber.

5 designates the fuel supply pipe and this pipe as will be seen is provided with a T shown at 6 which extends into mixing chamber. The flow of fuel through the pipe 5 to the burner 2 or to be more exact to the mixing chamber is regulated or controlled by valve or cock.

Extending transversely of the box or housing 1 and rigidly mounted therein are two rods 8 and 9, one of these rods, to wit, rod 8 being located adjacent the front of the housing 1, while the other rod 9 is located toward the rear of the housing. These rods are provided partially for the purpose of supporting a movable or adjustable food rack 10 which will be described in more detail later on.

At one side of the burner 2, that is, at the side of the housing 1 opposite to that at which the burner 2 is located is an adjustable burner 11. The upper part of this burner is of the same or of similar construction to that of the burner 2. However, this burner is made adjustable rather than fixed, as in the case of the burner 2, and the adjustment of this burner toward and away from the fixed burner 2, that is to say, transversely of the box or housing 1 is effected by means of rack and pinion mechanism. The rack teeth are formed in the rod 8 above referred to and are shown at 12.

The side of the burner 11 adjacent the side wall of the housing 1 is provided with a housing 13, this housing providing bearings for an adjusting rod 14, the outer end of which is provided with a handle 15 for its ready manipulation, the inner end of this rod within the housing 13 being provided with a pinion 16 which is in constant mesh with the rack teeth 12 on the rod 8. The rear end of this burner is guided by the rod 9 which extends transversely of the housing 1 adjacent the rear wall thereof. It will be apparent that by rotation of the rod 14 through the handle 15 the burner 11 may be adjusted in either direction transversely of the housing 1 to any degree desired so as to cause the burner to approach or recede from fixed burner 2.

The lower end of the burner 11 is provided with an extension 17 which is curved toward the burner 2 and is provided at its extremity with mixing chamber 18. This mixing chamber receives the pipe 5 which as before noted is a fuel supply pipe. The pipe 5, as will be appreciated, is fixed. By providing this extension on the burner 11 it will be seen that adjustment of the burner 11 may be effected without in any way affecting the flow of gas through the pipe 5 to the mixing chamber 18 which thereby permits of the use of a single valve or cock 7 for regulating the supplying of fuel to both burners. This construction greatly reduces the expense of manufacture and lessens the liability of failure of the apparatus to work, as compared with those types of cookers or broilers as heretofore constructed in which it has been found necessary to employ two valves or cocks, one for each burner, with the necessary piping, etc.

It will be appreciated from the description thus far given that the burner 11 is adjustable not only with respect to the fixed burner 2 but with respect to the food rack 10, the mounting of the rack 10 in no way being dependent upon the burner 11.

The rack 10 is in itself of novel construction and as will be seen from Fig. 4 particularly is composed of two wire members designated 19 and 20, respectively, these members being hinged or connected to each other for relative movement at 21 and held in position by a clamp ring 22. It will be understood of course that in applying the food to be cooked or broiled to this rack the ring 22 is slipped toward the front of the apparatus until it is entirely removed from the side 19 of the rack, whereupon the two sides of the rack may be separated sufficiently to enable the food to be placed between the sides, whereupon the ring 22 is slipped back again into place thereby clamping the food securely to the rack.

The novel feature of this rack is the construction shown at the bottom of the side members 19 and 20 and the front end thereof. This construction, as will be seen from Fig. 4, is in the form of a wire 23 which in the case of the side member 20 extends transversely of the cooker and then toward the front thereof as shown at 24, the wire then being bent downwardly as shown at 25 and rearwardly as shown at 26 beneath the bar or rod 8, the wire then passing back toward the side of the rack as shown at 27 and outwardly beneath the rod 8 and upwardly where it is secured to the rack side member as shown at 28. This in effect provides a flattened loop, the upper side of which lies above and in contact with the rod 8, the lower side lying below and in contact with the underside of the rod 8. The other side of the rack, that is, the side 19 is provided with a similar construction and consequently when the rack is in place the rear end thereof resting upon the rod 9 at the back of the cooker housing any side tilting of the rack is effectually prevented, the lateral extending foot provided at the bottom of the rack by the construction just described effectually supporting the rack against such tilting.

From the foregoing, therefore, it will be seen that I have provided a cooker or broiler of novel construction in which when gas is employed as a fuel the flow of the gas can be controlled by a single valve or cock, this control in no way being interfered with by the adjustment of the burner.

It will be seen also that the means provided for effecting adjustment of the burner is extremely simple in its construction which is of decided advantage in devices of this kind which go into the ordinary household and hence must be of such construction as not readily to get out of order.

I mention above that some features of my invention can be employed where fuel other than gas is used, such as electricity. In this connection I wish to state that in the case of using electricity as a fuel, as distinguished from gas, the same apparatus or construction may be employed for the adjustment of the burner 11 which in that event would be substituted by an electric heating element.

It is apparent also that the rack 10 which holds the food to be cooked or broiled can be used as readily in a cooker or broiler employing electricity as a fuel as in one employing gas as a fuel.

It is to be understood that changes may be made in the details of construction above described without departing from the spirit and scope of my invention.

What I claim is:—

1. In a cooker or broiler, the combination of a housing, a fixed heating element mounted therein, a pair of rods extending transversely of said housing one of said rods being located adjacent the front of the housing and the other adjacent the rear of the housing, an adjustable heating element supported by said rods, one of said rods being provided with rack teeth, and a pinion carried by the adjustable heating element and meshing with said rack teeth for adjusting said adjustable heating element transversely of said housing.

2. A cooker or broiler, comprising in combination a housing, a fixed heating element therein, an adjustable heating element within said housing, a pair of rods supporting said adjustable heating element, and a rack for supporting food intermediate said heating elements, said rack being supported by said rods and comprising skeleton side members, the lower portions of which side members are bent around one of said rods to provide lateral extensions on the side members thereby to maintain the rack in an upright position on said rod.

3. A food rack for cookers or broilers, comprising a pair of skeleton side members hinged to each other on their rear end, means at the forward end of said members for maintaining the two members in substantially parallel relation to each other, and means attached to the lower edge of each side member at the forward end thereof for maintaining the rack in an upright position on a support, said means comprising a wire extending laterally from the side member and provided with reverse bends so that the remote end of the wire is bent back to the side member of the rack to provide a pair of loops adapted to lie along the upper and lower sides of a member on which the rack is to be supported.

4. A cooker or broiler comprising a housing, a fixed burner therein, a movable burner therein, means for adjusting the movable burner relative to the fixed burner, a fuel supply pipe leading to the fixed burner, said pipe extending beyond the fixed burner and cooperating with the movable burner to permit adjustment of the movable burner without disturbing the relation of the fuel pipe, a food rack arranged between the burners, supports carried by the housing and common to said burners and food rack, and means on the food rack for slidably connecting such rack and one of said supports, the means for slidably connecting the food rack and support being arranged to prevent tilting of the food rack relative to the support.

5. A cooker or broiler including a housing, a fixed burner therein, a movable burner therein, a fuel supply pipe leading to the fixed burner, said pipe extending beyond the fixed burner and cooperating with the movable burner to permit adjustment of the movable burner without disturbing the relation of the fuel pipe, supporting rods carried by the housing and serving to support both burners, means carried by the movable burner and cooperating with one of the rods to adjust said movable burner on the rods relative to the fixed burner, and a food rack supported by the rods intermediate the burners and slidably cooperating with one of said rods, the sliding cooperation between the food rack and rod providing a relatively broad bearing for the rack on the rod to thereby prevent tilting of the rack.

6. A cooker or broiler including a housing, spaced supporting rods therein, a burner mounted on the rods and fixed relative to the housing, a second burner slidably supported on the rods for adjustment relative to the fixed burner, means carried by said second burner and operative from beyond the housing for cooperation with one of the rods to provide for adjusting the movable burner, a fuel supply pipe leading to the fixed burner, said pipe extending beyond the fixed burner and cooperating with the movable burner to permit adjustment of the movable burner without disturbing the relation of the fuel pipe, and a food rack arranged intermediate the burners, said food rack being supported on one of the rods and slidably cooperating with the other of said rods, the sliding cooperation of the food rack and rod providing for a bearing of the food rack on the rod in both directions beyond the food rack to prevent tilting of the rods.

7. A cooker or broiler including a casing, supporting rods arranged therein in spaced relation, a burner fixed relative to the casing, a second burner slidably cooperating with the rods, means carried by the second burner and cooperating with one of the rods to provide for adjustment of said second burner, a food rack supported on one of the rods and having an integral bearing portion extending in both directions beyond the food rack and slidably cooperating with the other of said rods, said bearing portion being open at one side to provide for convenient removal of the food rack from the rods.

8. A cooker or broiler including a housing, a fixed burner arranged in the housing, a movable burner slidably supported within the housing, means for adjusting the movable burner relative to the fixed burner, a fuel supply pipe leading to the fixed burner, said pipe being extended beyond the fixed burner and cooperating with the movable burner to permit adjustment of the movable burner without disturbing the relation of the fuel pipe, and a single valve arranged beyond the fixed burner relative to the movable burner for simultaneously controlling the flow of fuel to both burners.

9. A cooker or broiler comprising a housing, a pair of transverse bars supported therein, a fixed burner mounted on the transverse bars, a movable burner mounted on the transverse bars, means cooperating with the bars for adjusting the movable burner relative to the fixed burner, a food rack adjustably arranged between the burners, said food rack having means to engage the transverse bars to hold the rack in vertical position between the burners.

10. A cooker or broiler comprising a housing, a pair of transverse bars supported therein, a fixed burner mounted on the transverse bars, a movable burner mounted on the transverse bars, means cooperating with the supports for adjusting the movable burner relative to the fixed burner, a food rack adjustably arranged between the burners and supported at one end on one of the transverse bars and provided at its opposite end with means to slidably engage another transverse bar, whereby to hold said rack in vertical adjusted position between the burners.

11. A cooker or broiler including a casing, supporting rods arranged therein in spaced relation, a burner supported on the rods, a second burner slidably cooperating with the rods, means carried by the second burner and cooperating with one of the rods to provide for adjustment of said second burner, a food rack supported on one of the rods and having an integral bearing portion extending in both directions beyond the food rack and slidably cooperating with the other of said rods, said bearing portion being open at one side to provide for convenient removal of the food rack from the rods.

This specification signed this 7th day of October, 1929.

CHARLES C. BRUNNER.